July 19, 1932. R. S. CLAPP 1,868,093
AUTOMOBILE
Filed June 5, 1930  2 Sheets-Sheet 2
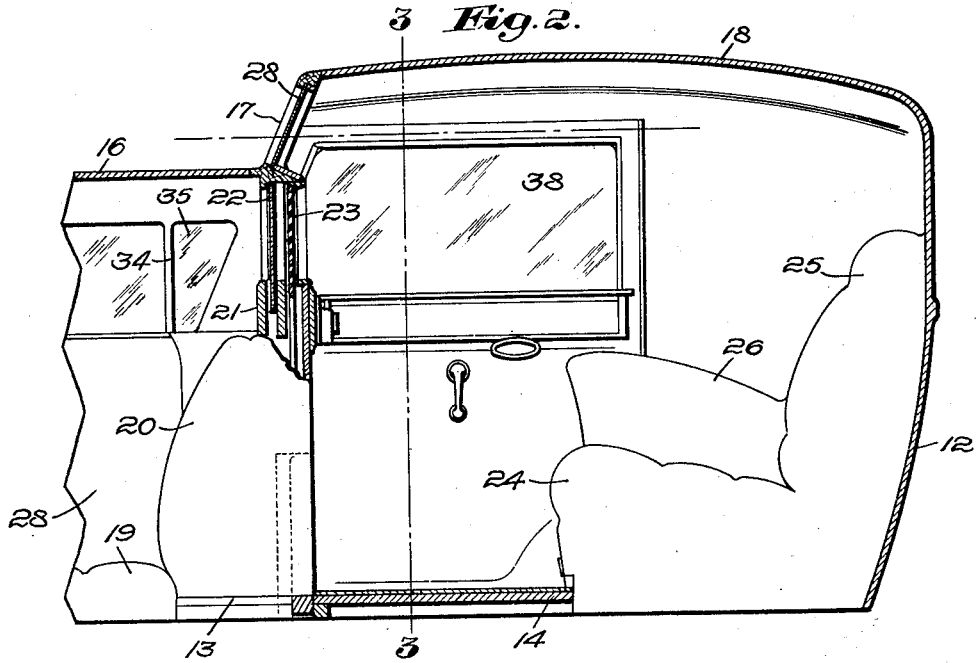
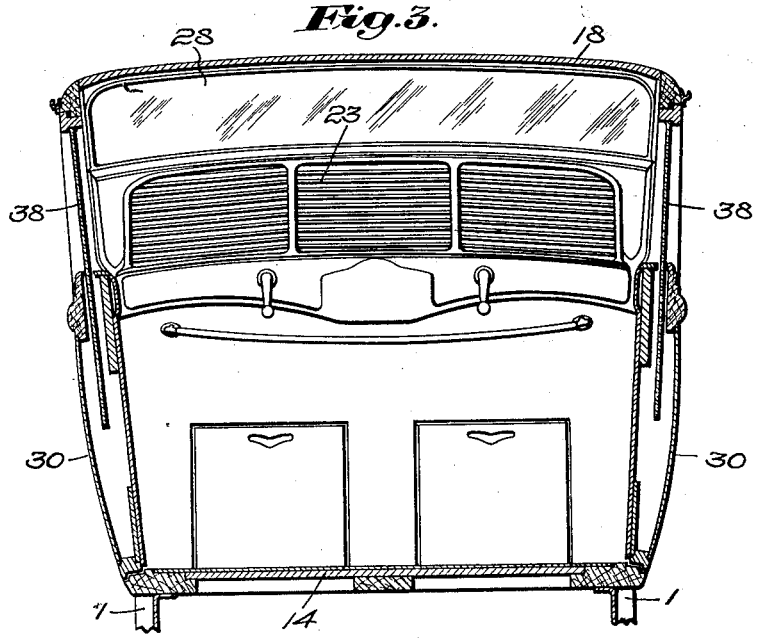
Inventor:
Roger S. Clapp,
by Emery, Booth, Varney & Townsend
Attys

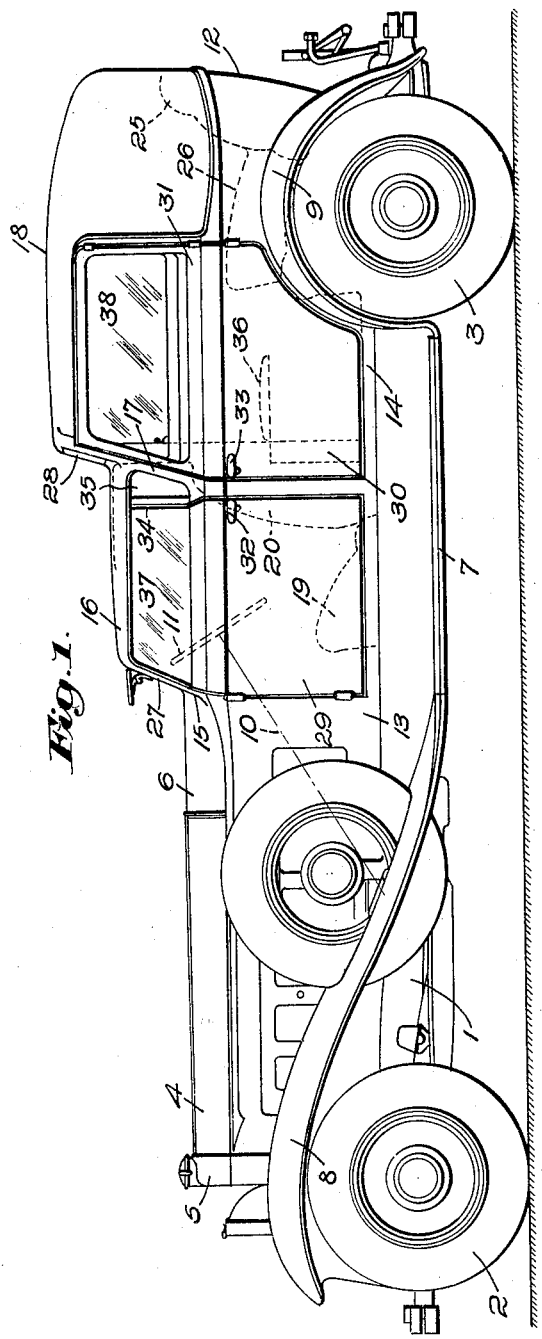

Patented July 19, 1932

1,868,093

UNITED STATES PATENT OFFICE

ROGER S. CLAPP, OF WEBSTER, MASSACHUSETTS, ASSIGNOR TO WATERHOUSE COMPANY, OF WEBSTER, MASSACHUSETTS, A CORPORATION OF MASSACHUSETTS

AUTOMOBILE

Application filed June 5, 1930. Serial No. 459,409.

This invention aims to provide a novel and improved automobile, the invention residing largely in the body part thereof.

My invention aims generally to provide a construction that shall afford a sense of greater seclusion and privacy in the rear compartment of a two-compartment car, and also a wider and more satisfactory vision for the occupants of the rear compartment.

The foregoing, with other features of my invention, will be more clearly understood from a description taken in connection with the accompanying drawings of a preferred embodiment of my invention.

In the drawings:—

Fig. 1, in side view, shows an automobile illustrating one embodiment of my invention;

Fig. 2, a vertical longitudinal section through the rear portion of the vehicle body; and Fig. 3, a vertical transverse section taken on the dotted line 3—3, Fig. 2, looking to the left or front.

Referring to the illustrative embodiment shown in the drawings, the chassis, comprising the frame members 1 mounted upon the wheels 2 and 3, and provided with a suitable engine housed within the engine bonnet 4, at the front of which is the radiator 5, and at the rear, the cowl 6, together with the running board 7, front and rear mudguards 8 and 9, usual steering post 10, and steering wheel 11, together with other features of a customary or desired chassis, may be of usual construction and operation.

Mounted upon the chassis in suitable manner is the body 12, which may be of a permanently closed type or of convertible construction, as desired. In the present instance I have shown a permanently closed body.

The body is provided with front and rear compartments, the floors 13 and 14 of which are at substantially the same level and, as is customary, rest upon or are close to the frame members 1 of the chassis.

The front compartment is bounded at its front corners by the upstanding corner pillars 15, which are secured in suitable manner to the cowl 6, and carry at their upper ends the forward portion of the front or driver's compartment roof 16. This roof, at its rear end, is supported by the middle pillars or posts 17, which also carry at their upper ends the front end of the top 18 of the rear or passenger compartment, said top 18 being at the usual or normal level.

The roof 16 of the front compartment is built at a sub-normal level and, to accommodate the driver when operating the car, the front or driver's seat 19, in the rear of the front compartment, is placed close to or, as herein shown, somewhat below the floor of the front compartment.

The back 20 of the front or driver's seat is herein supported against the partition 21, see Fig. 2, that separates the front and back compartments. This partition may be of suitable construction and is equipped with a preferably sliding glass 22, which, when in the position shown in Fig. 2, completely isolates the compartments one from the other and, when depressed by suitable mechanism, places the two compartments in open communication with each other in well known manner.

In the rear of the glass 22, I have herein shown a vertical adjustable slatted shutter 23, which also may be raised in suitable manner to shut off the view through the light 22 or its opening from one compartment to the other, or lowered to permit view through from one compartment to the other.

The rear compartment is equipped with a usual rear seat 24 provided with a back 25 and arm 26.

The front compartment is provided with an upwardly and rearwardly inclined windshield 27, and the rear compartment is provided with a preferably upwardly and rearwardly inclined transom 28, between the front compartment roof 16 and the rear compartment roof 18.

As stated, the roof 16 of the front compartment is depressed to a sub-normal level, preferably to about 41 inches from the chassis frame to permit the transom 28 to be placed in the front of the rear compartment and clear the front compartment roof without requiring the roof 18 of the rear compartment to be at a higher level than the conventional style calls for. I have found that a transom exhibiting a vertical width of 7 to 9 inches may be employed without difficulty and still retain the roof 18 of the rear compartment at not exceeding a preferred height of 52 inches above the chassis frame.

To give as much vertical width of vision as possible to the windshield 27 and transom 28, I prefer that they be made fixed, that is to say, non-adjustable, in order that the usual marginal frames for the glass may be dispensed with and the glass set permanently in the fixed frames provided therefor. If either of said glasses be made adjustable, suitable frames would be required for holding and moving it, which frames must necessarily cut down the field of vision therethrough. While, therefore, the windshield and transom may be made adjustable, if desired, and the limitation of vision is not objectionable, I still prefer the more generous vision that goes with a fixed glass.

The front and rear compartments are provided respectively with doors 29 and 30, the front doors being hinged at their front edges in suitable manner to the corner pillars 15, and the rear doors being hinged, also in suitable manner, to rear columns 31. As shown, the doors swing outward from and close upon the middle post 17, said doors being provided with suitable latch handles 32 and 33.

The front edges of the doors are shown as rearwardly inclined to fit the inclination of the posts or pillars against which the doors are fitted. The rear edges of the doors are substantially vertical as shown, the middle pillar or post 17 being provided with a triangular frame portion 34 having a vertical front member to accommodate the vertical rear edge of the front door, and with a middle glass panel 35, which adds lightness to the structure while making possible to preserve the rearward inclination of the posts.

The depression of the front compartment top to the sub-normal height referred to makes it possible to retain the rear and higher portion of the body at the conventional level, and thus not only adds to the appearance of the car but preserves a low center of gravity. Because of the low roof of the front compartment and particularly because of the transom 28 above that roof, a passenger occupying the rear compartment obtains a forward vision above and clear of the front compartment roof, and thus gains a sense of exclusiveness and privacy that is neither afforded not obtainable in closed cars having a continuous roof with forward vision only through the front or driver's compartment. And this is obtained while preserving the floors of the two compartments at a common level, substantially that of the top lines of the frame members 1, and with the entrance and egress or foot areas that extend across the car from side to side provided with free, direct access to and from the doorways.

It will be observed that the doors extend from the floor levels to substantially the tops respectively of the front and rear compartments. To this end, the doors to the rear compartment open close to the front wall of said compartment, making entrance and egress easy to those who are likely to be called upon to step across from one side of the car to the other, while the doors for the front compartment open close to the rear wall thereof, while preserving at the same time free entrance and egress to and from the floor area in front of the seat 19, thus making it natural and easy for the driver, or anyone occupying the driver's seat, to take his place upon that seat without inconvenience notwithstanding the low position of the seat and its relation to the steering wheel 11. The foot area for the front compartment extends well forward into the cowl. Usual, folding seats 36 may be provided in the rear compartment.

The doors are provided with the usual adjustable lights 37 and 38.

The range of vision obtained by the passenger in the rear compartment looking forward through the transom 28 is very much increased, both vertically and laterally, over anything possible in a sedan or closed car of conventional design where the field of vision is constantly restricted by the overlying roof or top of the front compartment.

My invention is not restricted to the particular embodiment shown but may be varied within the scope of the appended claims.

I claim:

1. The described body for automobiles, the same having a front compartment, the top of which is depressed to a sub-normal level, and with a windshield below its top; a rear compartment having the same floor level as the front compartment but with its top at a normal and higher level than the front compartment top and with a transom between said two tops; a seat in said rear compartment located to position a normal occupant at a normal distance from the floor thereof with a range of vision through said transom, a seat in said front compartment located relatively close to the floor thereof to position a normal occupant at a lower level than an occupant of the rear seat with his head below the top of said front compartment and with a range of vision through said windshield; said seats being in the rear portions of said compartments to leave combined foot and entrance areas across the front portions of said compartments; and side entrance doors for and of substantially the full heights of the respective compartments, furnishing in each instance free side entrance and egress to and from said combined foot and entrance areas.

2. The described body for automobiles, the same having a front compartment, the top of which is depressed to a sub-normal level, and with a windshield below its top; a rear compartment having the same floor level as the front compartment but with its top at a normal and higher level than the front compartment top and with a transom between said two tops; a seat in said rear compartment located to position a normal occupant at a normal distance from the floor thereof with a range of vision through said transom, a seat in said front compartment located relatively close to the floor thereof to position a normal occupant at a lower level than an occupant of the rear seat with his head below the top of said front compartment and with a range of vision through said windshield; said seats being in the rear portions of said compartments to leave combined foot and entrance areas across the front portions of said compartments; and side entrance doors for and of substantially the full heights of the respective compartments, furnishing in each instance free side entrance and egress to and from said combined foot and entrance areas, said wall between said compartments being provided below said transom with vertical adjustable glass and shutter as shown and described.

In testimony whereof, I have signed my name to this specification.

ROGER S. CLAPP.